(12) United States Patent
Yang et al.

(10) Patent No.: US 9,743,355 B2
(45) Date of Patent: Aug. 22, 2017

(54) POWER SAVE METHOD AND STATION DEVICE

(71) Applicant: Huawei Technologies Co., Ltd., Shenzhen, Guangdong (CN)

(72) Inventors: Lvxi Yang, Shenzhen (CN); Yanhong Chen, Shenzhen (CN); Yunbo Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1 day.

(21) Appl. No.: 14/138,570

(22) Filed: Dec. 23, 2013

(65) Prior Publication Data

US 2014/0185506 A1 Jul. 3, 2014

Related U.S. Application Data

(63) Continuation of application No. PCT/CN2012/072886, filed on Mar. 23, 2012.

(30) Foreign Application Priority Data

Jun. 24, 2011 (CN) .......................... 2011 1 0173688
Sep. 15, 2011 (CN) .......................... 2011 1 0273700

(51) Int. Cl.
*H04W 52/02* (2009.01)

(52) U.S. Cl.
CPC ... *H04W 52/0235* (2013.01); *H04W 52/0229* (2013.01); *H04W 52/0216* (2013.01); *Y02B 60/50* (2013.01)

(58) Field of Classification Search
None
See application file for complete search history.

(56) References Cited

U.S. PATENT DOCUMENTS 7,669,070 B2* 2/2010 Asmi .................... G06F 1/3203
713/310
2004/0190467 A1* 9/2004 Liu ................... H04W 52/0216
370/311
(Continued)

FOREIGN PATENT DOCUMENTS

CN 1725888 A 1/2006
CN 101584229 A 11/2009
(Continued)

OTHER PUBLICATIONS

Stacey et al., "Specification Framework for TGac," IEEE P802.11, Wireless LANs, IEEE 802.11-09/0992r21, Institute of Electrical and Electronics Engineers, New York, New York (Jan. 19, 2011).
(Continued)

*Primary Examiner* — Andrew Lai
*Assistant Examiner* — Jamaal Henson
(74) *Attorney, Agent, or Firm* — Leydig, Voit & Mayer, Ltd.

(57) ABSTRACT

A power save method and a station device. The method includes: confirming, by a STA, according to a frame type identifier in a received frame, that the frame is an NDPA frame, and obtaining a STA AID in a STA information field in the NDPA frame; comparing, by the STA, its STA AID with the obtained STA AID, and determining whether its STA AID is the same as the obtained STA AID; and when the STA determines that its STA AID is different from the obtained STA AID, allowing the STA to enter a doze state. The method reduces the power consumption during the TXOP period and saves resources.

13 Claims, 4 Drawing Sheets

(56) References Cited

U.S. PATENT DOCUMENTS

| | | | |
|---|---|---|---|
| 2005/0009578 A1 | 1/2005 | Liu | |
| 2005/0277429 A1* | 12/2005 | Laroia et al. | 455/458 |
| 2006/0019722 A1 | 1/2006 | Lee | |
| 2010/0008276 A1 | 1/2010 | Kopikare et al. | |
| 2010/0232331 A1* | 9/2010 | Son | H04L 1/188 370/311 |
| 2011/0096685 A1* | 4/2011 | Lee | H04L 27/0012 370/252 |
| 2011/0128929 A1 | 6/2011 | Liu et al. | |
| 2011/0128947 A1* | 6/2011 | Liu | H04L 25/03343 370/338 |
| 2011/0225440 A1* | 9/2011 | Kwon | H04W 52/0235 713/323 |
| 2012/0075519 A1 | 3/2012 | Blasch | |
| 2013/0326920 A1* | 12/2013 | Hopper | A44C 3/002 40/1.5 |
| 2013/0329620 A1* | 12/2013 | Kim | H04W 52/0229 370/311 |

FOREIGN PATENT DOCUMENTS

| | | |
|---|---|---|
| CN | 102076067 A | 5/2011 |
| KR | 20110128929 A | 11/2011 |
| RU | 2141725 C1 | 11/1999 |
| RU | 2413370 C2 | 2/2011 |
| WO | WO 9611556 A1 | 4/1996 |
| WO | WO 2007081683 A2 | 7/2007 |

OTHER PUBLICATIONS

Stacey et al., "Proposed TGac Draft Amendment," IEEE P802.11, Wireless LANs, IEEE 802.11-10/1361r3, 154 pages total, IEEE (Jan. 18, 2011).

Merlin et al., "11ac NDPA frame format," IEEE P802.11, Wireless LANs, 6 pages total, IEEE (Mar. 14, 2011).

Sandhya et al., "Comment resolution for CIDs: 2110, 3578, 2288," IEEE P802.11, Wireless LANs, Doc. IEEE 802.11-yy/xxxxr00, 5 pages total, IEEE (Nov. 7, 2011).

"Draft Standard for Information Technology—Telecommunications and information exchange between systems—Local and metropolitan area networks—Specific requirements; Part 11: Wireless LAN Medium Access Control (MAC) and Physical Layer (PHY) specifications," IEEE P802.11-REVma™/D9.0, IEEE, New York, New York (2006).

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6 GHz," IEEE P802.11ac/D1.4, IEEE, New York, New York (Nov. 2011).

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Higher Throughput," IEEE Std 802.11 n™-2009, IEEE, New York, New York (Oct. 29, 2009).

"IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 8: Medium Access Control (MAC) Quality of Service Enhancements," IEEE Std 802.11e-2005, pp. i-189, Institute of Electrical and Electronics Engineers, New York, New York (Nov. 11, 2005).

Gu et al., "On Security Vulnerabilities of Null Data Frames in IEEE 802.11 based WLANs," The 28th International Conference on Distributed Computing Systems, pp. 28-35, Institute of Electrical and Electronics Engineers, Valbonne, France (2008).

* cited by examiner

POWER SAVE METHOD AND STATION DEVICE

CROSS-REFERENCE TO RELATED APPLICATIONS

This application is a continuation of International Patent Application No. PCT/CN2012/072886, filed on Mar. 23, 2012, which claims priority to Chinese Patent Application No. 201110173688.X, filed on Jun. 24, 2011 and Chinese Patent Application No. 201110273700.4, filed on Sep. 15, 2011, all of which are hereby incorporated by reference in their entireties.

FIELD OF THE INVENTION

Embodiments of the present invention relate to communication technology, and in particular, to a power save method and a station device.

BACKGROUND OF THE INVENTION

The conventional wireless local area network standard enhances the support for quality of service (Quality of Service, QoS). The transmission opportunity (Transmission Opportunity, TXOP) in a hybrid coordination function (Hybrid Coordination Function, HCF) mechanism is a basic unit for radio channel access. The TXOP is a bounded period defined by the initial time and the duration, and allows continuous use of a channel within the duration. The duration cannot exceed the maximum duration (TXOP Limit).

In a basic service set (Basic Service Set, BSS) formed of an access point (Access Point, AP) and multiple stations (Stations, STAs), the AP and the STAs contend for a TXOP through a channel access process. Once the AP or a STA obtains the TXOP, the AP or the STA can continuously use the channel within the TXOP duration without contending for the channel again. Because within one TXOP, not all STAs need to receive data frames, so a very high throughput (Very High Throughput, VHT) TXOP power save mode (VHT TXOP power save mode) is introduced. When the STA finds that no data frame is sent to it, the STA enters the doze (Doze) state to save power during the TXOP. In the doze state, the STA can neither send data frames nor receive data frames, and thus the consumed power is very low. For a STA supporting TXOP power save (generally, a non AP VHT STA), if the AP in the current frame allows the STA in the BSS to enter the Doze state during the TXOP, the STA enters the Doze state when one of the following conditions is satisfied, and stays in the Doze state until the current TXOP ends:

(1) Through a group identifier (GROUP_ID) parameter in a receive parameter vector (RXVECTOR), the non AP VHT STA finds that the non AP VHT STA itself is not a member of the group.

(2) The non AP VHT STA finds that a partial association identifier (PARTIAL_AID) in the RXVECTOR is inconsistent with a partial AID of the non AP VHT STA, or the non AP VHT STA finds that the frame is not sent to the non AP VHT STA.

(3) Through the indication of the GROUP_ID parameter in the RXVECTOR, the non AP VHT STA finds that the non AP VHT STA itself is a member of the group, but the number of space-time streams (Number of Space-Time Streams, NUM_STS) in the RXVECTOR received by the non AP VHT STA is set to 0.

(4) The non AP VHT STA sends an acknowledgment signal to respond to the received frame whose More Data field is set to 0.

In the actual application process, the AP not only sends data frames to the STA, but also may require, through a null data packet announcement (Null Data Packet Announcement, NDPA) frame, the STA to feed back channel state information (Channel State Information, CSI). When the AP requires multiple rather than all STAs to feed back CSI information, by setting the GROUP_ID in the transmit parameter vector (TXVECTOR) of the NDPA frame to 63 and setting PARTIAL_AID to 0, the AP notifies all STAs by broadcast that the AP requires multiple STAs to feed back CSI information. In this case, none of the STAs satisfies any one of the conditions for entering the doze state. Therefore, all STAs are in the awake (Awake) state. Because the STAs are fully powered in the Awake state, a lot of power is consumed during the TXOP.

SUMMARY OF THE INVENTION

Embodiments of the present invention provide a power save method and a station device, which can be used to reduce power consumption and save resources during a TXOP when an AP requires multiple STAs to feed back CSI information.

An embodiment of the present invention provides a power save method, including:

confirming, by a station STA, according to a frame type identifier in a received frame, that the frame is a null data packet announcement NDPA frame, and obtaining a STA association identifier AID in a STA information field in the NDPA frame;

comparing, by the STA, its STA AID with the obtained STA AID, and determining whether its STA AID is the same as the obtained STA AID; and when the STA determines that its STA AID is different from the obtained STA AID, allowing the STA to enter a doze state.

An embodiment of the present invention provides a station device, including:

a first obtaining module, configured to confirm, according to a frame type identifier in a received frame, that the frame is a null data packet announcement NDPA frame, and obtain a station STA association identifier AID in a STA information field in the NDPA frame;

a determination module, configured to compare a STA AID of the station device with the obtained STA AID, and determine whether the STA AID of the station device is the same as the obtained STA AID; and an entry module, configured to allow the STA to enter a doze state when a determination result of the determination module is no.

With the power save method and the station device in the embodiments of the present invention, when an NDPA frame is received, a STA determines whether the STA AID in the STA information field in the NDPA frame is the same as its STA AID, and if not, confirms that the STA itself is not the one required by the AP to return CSI information, and allows the STA to enter the doze state, thus reducing power consumption of the STA itself and saving resources.

DETAILED DESCRIPTION OF THE EMBODIMENTS

Figure 1A:
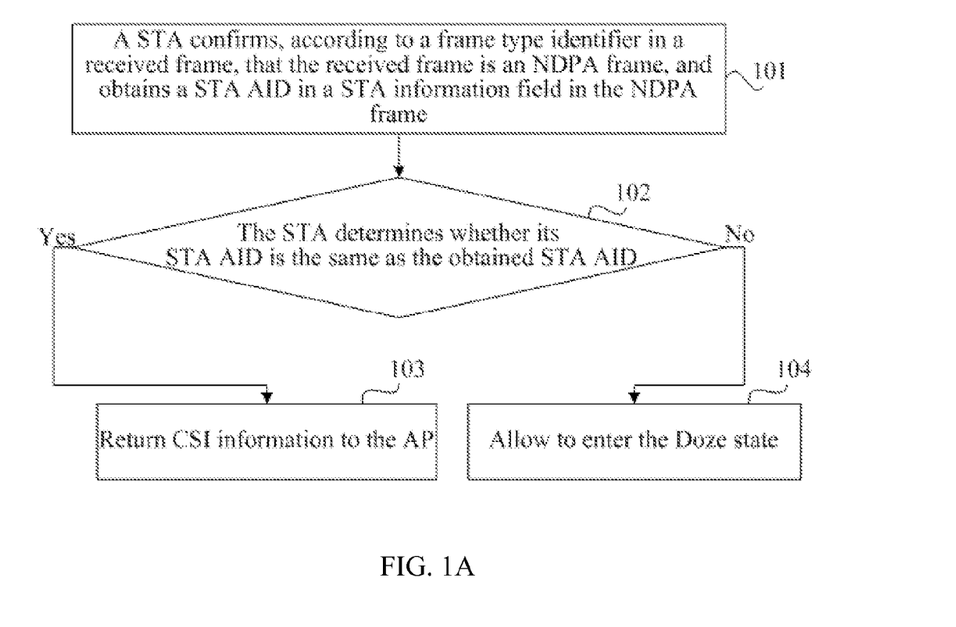
FIG. 1A is a flow chart of a power save method according to an embodiment of the present invention.

FIG. 1A is a flow chart of a power save method according to an embodiment of the present invention. As shown in FIG. 1A, the method in the embodiment includes the following steps:

Step 101: A STA confirms, according to a frame type identifier in a received frame, that the received frame is an NDPA frame, and obtains a STA association identifier (Association Identifier, AID) in a STA information field (STA Info field) in the NDPA frame.

In a BSS, an AP and a STA may work in two modes: a single-user mode and a multiple-user mode. The single-user mode means that the AP communicates with only one STA, or communicates with multiple STAs by broadcast; the multiple-user mode means that the AP communicates with multiple STAs by space division multiplexing. The NDPA frame in each embodiment of the present invention is a frame in a single-user mode sent by the AP by broadcast. In the BSS, to ensure that the AP can communicate with multiple STAs correctly, STAs are grouped for management, and each group has a unique group identifier (GROUP_ID). Each STA knows its group, and locally stores the GROUP_ID of the group the STA belongs to.

When the AP successfully contends for a TXOP through a channel access process, the AP sends a data frame to the STA within the TXOP duration. When the multiple-user mode is used for transmission, the AP carries GROUP_ID in the data frame sent to the STA. When the STA receives the data frame, the STA determines, by comparing the GROUP_ID in the data frame with the locally stored GROUP_ID, whether the data frame is sent to the group the STA belongs to. If the locally stored GROUP_ID is different from the GROUP_ID in the data frame, the STA confirms that the data frame is not sent to the group the STA belongs to. If the locally stored GROUP_ID is the same as the GROUP_ID in the data frame, the STA further determines whether NUM_STS in the data frame is 0; if the determination result shows NUM_STS is greater than 0, it indicates that the data frame includes the data sent to the STA; if the determination result shows NUM_STS is 0, it indicates that the data frame does not include the data sent to the STA. NUM_STS is used to identify the number of space-time streams of a STA in the group.

When the single-user mode is used for transmission, the data frame sent by the AP to the STA carries PARTIAL_AID. When receiving the data frame, the STA determines, by comparing the PARTIAL_AID in the data frame with its PARTIAL_AID, whether the data frame is sent to the STA. If its PARTIAL_AID is different from the PARTIAL_AID in the data frame, the STA confirms that the frame is not sent to the STA. If its PARTIAL_AID is the same as the PARTIAL_AID in the data frame, the STA further determines, according to the information (for example, a MAC address of a receiver) in the medium access control (Medium Access Control, MAC) frame header, whether the data is sent to the STA.

In the actual application process, the AP not only sends the data frame to the STA, but also requires the STA to feed back CSI information sometimes. When the AP requires multiple STAs to return CSI within the TXOP duration, the AP sets the GROUP_ID in the transmit parameter vector (TXVECTOR) in the NDPA frame to 63, and sets PARTIAL_AID to 0. The GROUP_ID being set to 63 and the PARTIAL_AID being set to 0 indicate that the current frame is a broadcast frame and all STAs need to receive the current frame. However, actually, the AP does not require all STAs to feed back CSI information. The AP sets the AID of each STA that the AP requires to feed back CSI information in the STA information field of the NDPA frame respectively, where the number of STA information fields is equal to the number of STAs required to feed back CSI.

Figure 1B:
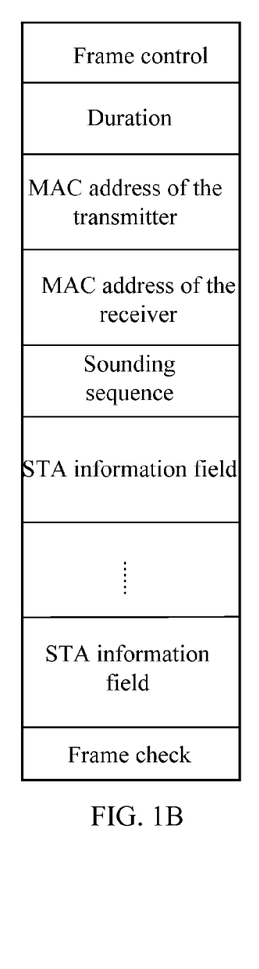
FIG. 1B is a schematic partial structural diagram of an NDPA frame being parsed to a MAC layer according to an embodiment of the present invention.
Figure 1C:
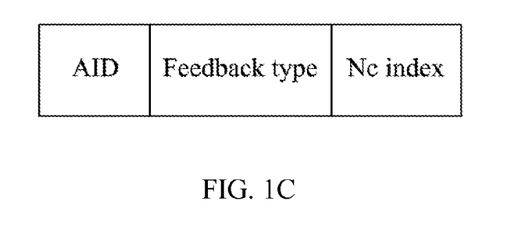
FIG. 1C is a schematic structural diagram of a STA AID field according to an embodiment of the present invention.

A partial structure of the NDPA frame in the embodiment being parsed to the MAC layer is shown in FIG. 1B. As shown in FIG. 1B, the MAC layer information carried in the NDPA frame mainly includes: frame control (Frame Control), a duration (Duration), a MAC address of a transmitter (namely, the MAC address of the AP), a MAC address of a receiver (namely, the MAC address corresponding to the broadcast field, usually preset), a sounding sequence (Sounding Sequence), one or multiple STA information fields, and a frame check sequence (FCS) field. The frame control field includes information such as the type of the current frame, and whether the current frame is an NDPA frame may be determined through the frame control field. The STA information field is used to store the AID of the STA that the AP requires to return CSI information. As shown in FIG. 1B, when the AP requires multiple STAs to return CSI information, the NDPA frame includes multiple STA information fields. The structure of each STA information field is shown in FIG. 1C, and includes an AID field of the STA, a feedback type (Feedback Type) field, and a number of columns index (Nc Index) field.

Based on the above description, after receiving the frame sent by the AP, the STA first performs physical layer parsing on the received frame; when identifying, according to the information in the physical layer frame header, that the currently received frame is a broadcast frame, further performs MAC layer parsing on the currently received frame; and obtains the frame control field in the MAC layer frame header, and determines, according to the frame type identifier in the frame control field, whether the currently received frame is an NDPA frame. The values of frame type identifiers corresponding to different types of frames are different. In the embodiment, the STA confirms, according to the value of the frame type identifier, that the current frame is an NDPA frame, obtains multiple STA information fields from the NDPA frame, and then parses the multiple STA information fields to obtain the STA AID.

Step 102: The STA compares its STA AID with the obtained STA AID, and determines whether its STA AID is the same as the obtained STA AID; if the determination result is yes, that is, the STA information field of the NDPA frame includes the STA AID of the STA, executes step 103; and if the determination result is no, that is, the STA information field of the NDPA frame does not include the STA AID of the STA, executes step 104.

After obtaining the STA AID carried in the NDPA frame, the STA compares its STA AID with the obtained STA AID, and determines whether its STA AID is the same as the obtained STA AID, that is, determines whether the STA itself is a STA that the AP requires to return CSI information. If the STA AID of the STA is the same as the obtained STA AID, it indicates that the STA is the STA that the AP requires to return CSI information. If the STA AID of the STA is different from the obtained STA AID, it indicates that the STA is not the STA that the AP requires to return CSI information, or that the AP does not require the STA to return CSI information.

If the NDPA frame carries multiple STA information fields, the STA needs to compare its STA AID with the STA AID in each STA information field in the NDPA frame so as to determine whether the STA itself is the STA that the AP requires to return CSI information.

Step 103: Return CSI information to the AP.

When the AP requires the STA to return CSI information, the STA must be in the Awake state, that is, in the fully powered state, so as to return CSI information to the AP. After returning CSI information to the AP, the STA may terminate the operation of allowing the STA to enter the doze state to save power.

However, after the determination, even if its STA AID and the obtained STA AID are the same, the STA may be allowed to enter the doze state subsequently when other conditions for allowing the STA to enter the doze state are satisfied. Further, for STAs other than the first STA in the STA information field, the CSI feedback of the STA needs to be obtained through the beamforming report poll (Beamforming Report Poll) frame sent by the AP. The Beamforming Report Poll frame is usually sent in the single-user mode. If the Beamforming Report Poll frame is sent by the physical layer using the VHT format, because the PARTIAL_AID parameter does not match the PARTIAL_AID of STAs other than the first STA in the STA information field list, the STAs other than the first STA in the STA information field list enter the Doze state incorrectly.

To prevent the STAs other than the target STA from entering the Doze state incorrectly, one of the following multiple methods may be used:

In the first method, when the STA decides that its AID is consistent with the AID in the STA information field of the NDPA frame, the STA is no longer allowed to enter the Doze state within the current TXOP.

Alternatively, in the second method, after the STA decides that its AID is consistent with the AID in the STA information field of the NDPA frame, if a Beamforming Report Poll frame is received, even if the STA finds that it (the STA) is not the target address of the Beamforming Report Poll frame (that is, the PARTIAL_AID parameter in the Beamforming Report Poll frame does not match the PARTIAL_AID parameter of the STA), the STA is not allowed to enter the Doze state.

Alternatively, in the third method, after the STA decide that its AID is consistent with the AID in the STA information field of the NDPA frame, before the Beamforming Report Poll frame is received from the AP, even if the STA finds that the STA itself is not the target address of the Beamforming Report Poll frame (that is, the PARTIAL_AID parameter in the Beamforming Report Poll frame does not match the PARTIAL_AID parameter of the STA), the STA is not allowed to enter the Doze state.

Alternatively, in the fourth method is, when the Beamforming Report Poll frame is sent by the physical layer using the VHT format, the TXOP_PS_NOT_ALLOWED parameter is set to 1.

Alternatively, in the fifth method, a conventional (legacy) physical layer format is used to send the Beamforming Report Poll frame.

Step 104: Allow the STA to enter the Doze state.

When the AP does not require the STA to return CSI information, the STA does not need to return CSI information to the AP. The STA does not need to be in the state of being fully powered under this condition, and therefore, the STA may enter the Doze state. However, for a STA, there are other factors restricting the power state, for example, if the STA has data to be sent at this time, the STA may select not to enter the Doze state to have more opportunities to successfully contend for a channel in the case of truncation of the current TXOP. Therefore, in this embodiment, when the STA determines that the STA is allowed to enter the Doze state without being required to feed back CSI information, the STA further performs determination on other entry conditions; and when other entry conditions are also satisfied, the STA enters the Doze state and does not wake until the current TXOP ends. If no other entry condition exists, the STA may directly enter the Doze state.

With the power save method in this embodiment, the STA identifies the type of the received frame, and when identifying that the received frame is an NDPA frame, compares its STA AID with the STA AID in the NDPA frame to determine whether the STA itself needs to feed back CSI information, confirms that it is unnecessary to feed back CSI information and allows the STA to enter the Doze state, thus reducing power consumption and saving resources.

Figure 2:
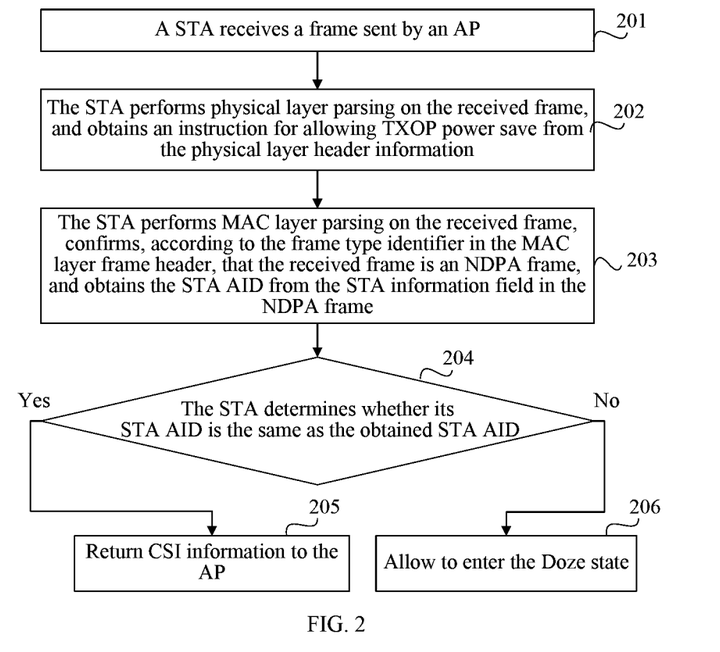
FIG. 2 is a flow chart of a power save method according to another embodiment of the present invention.

FIG. 2 is a flow chart of a power save method according to another embodiment of the present invention. As shown in FIG. 2, the method in this embodiment includes the following steps:

Step 201: A STA receives a frame sent by an AP.

After obtaining a TXOP, the AP may send to the STA within the TXOP duration various types of frames such as a control frame and a data frame. The STA receives the frame sent by the AP.

Step 202: The STA performs physical layer parsing on the received frame, and obtains an instruction for allowing TXOP power save from the physical layer header information.

When receiving the frame sent by the AP, the STA first performs physical layer parsing on the received frame, and obtains physical layer related information carried in the physical layer header. The physical layer header includes information about whether the current frame is a broadcast frame, and therefore, the STA may confirm, according to the physical layer header information, whether the received frame is broadcast frame. In this embodiment, the STA confirms, according to the physical layer header information, that the received frame is a broadcast frame.

In addition, during the TXOP, the STA can enter the Doze state only when the AP allows the STA in the BSS where the AP is located to enter the Doze state. The AP indicates, through a bit in the physical layer header of the frame sent to the STA, whether to allow the STA in the BSS where the AP is located to perform TXOP power save. Exemplarily, the AP uses the bit carrying the parameter of transmission opportunity power save not allowed (Transmission Opportunity_Power Save_NOT_ALLOWED, TXOP_PS_NOT_ALLOWED) in a very high throughput-information-A1 (Very High Throughput-SIGNAL-A1, VHT-SIG-A1) field to identify the instruction for whether to allow the TXOP power save. When TXOP_PS_NOT_ALLOWED is set to 0, it indicates that the STA is allowed to perform TXOP power save. The STA then has an opportunity to enter the Doze state at this time, namely, the instruction is an instruction for allowing the TXOP power save; when TXOP_PS_NOT_ALLOWED is set to 1, it indicates that the STA is not allowed to perform TXOP power save, that is, the STA cannot enter the Doze state, namely, the instruction is an instruction for not allowing the TXOP power save. In this embodiment, the physical layer header of the frame received by the STA further includes information of an instruction about whether the AP allows the STA to perform TXOP power save, where the information is indicated by the value of the bit carrying the TXOP_PS_NOT_ALLOWED parameter in the physical layer header. The STA obtains the value of the bit identifying the TXOP_PS_NOT_ALLOWED parameter from the physical layer header, where the value of the bit is 0, that is, obtains the instruction for allowing the TXOP power save.

Step 203: The STA performs MAC layer parsing on the received frame, confirms, according to the frame type identifier in the MAC layer frame header, that the received frame is an NDPA frame, and obtains the STA AID from the STA information field in the NDPA frame.

Specifically, when the STA determines that the received frame is a broadcast frame, the STA further parses the NDPA frame, namely, performs MAC layer parsing, and obtains the MAC layer information carried in the frame. The STA can identify, according to the frame type identifier carried in the frame control field in the MAC frame header, that the currently received frame is an NDPA frame, obtains the STA information field in the NDPA frame, and further parses the STA information field to obtain the STA AID.

Step 204: The STA compares its STA AID with the STA AID obtained from the STA information field in the NDPA frame, and determines whether its STA AID is the same as the obtained STA AID; if the determination result is yes, executes step 205; and if the determination result is no, executes step 206.

Step 205: Return CSI information to the AP. At this time, the operation of allowing the STA to enter the doze state to save power may be terminated. However, after the determination, even if its STA AID and the obtained STA AID are the same, the STA may be allowed to enter the doze state subsequently when other conditions for allowing the STA to enter the doze state are satisfied. The method described in step 103 may continue to be applied in the subsequent operations.

Step 206: Allow the STA to enter the Doze state.

Step 204 to step 206 may be referred to the description of step 102 to step 104 in the foregoing, and are not further described herein.

With the power save method in this embodiment, the STA obtains from the NDPA frame, by performing physical layer parsing on the received frame, an instruction that the AP allows the STA to enter the Doze state, which provides a basis for that subsequently the STA confirms whether to allow the STA to enter the Doze state. Furthermore, in this embodiment, when the STA learns that the AP does not allow the STA to enter the Doze state, the operation may be terminated directly to save power.

Figure 3:
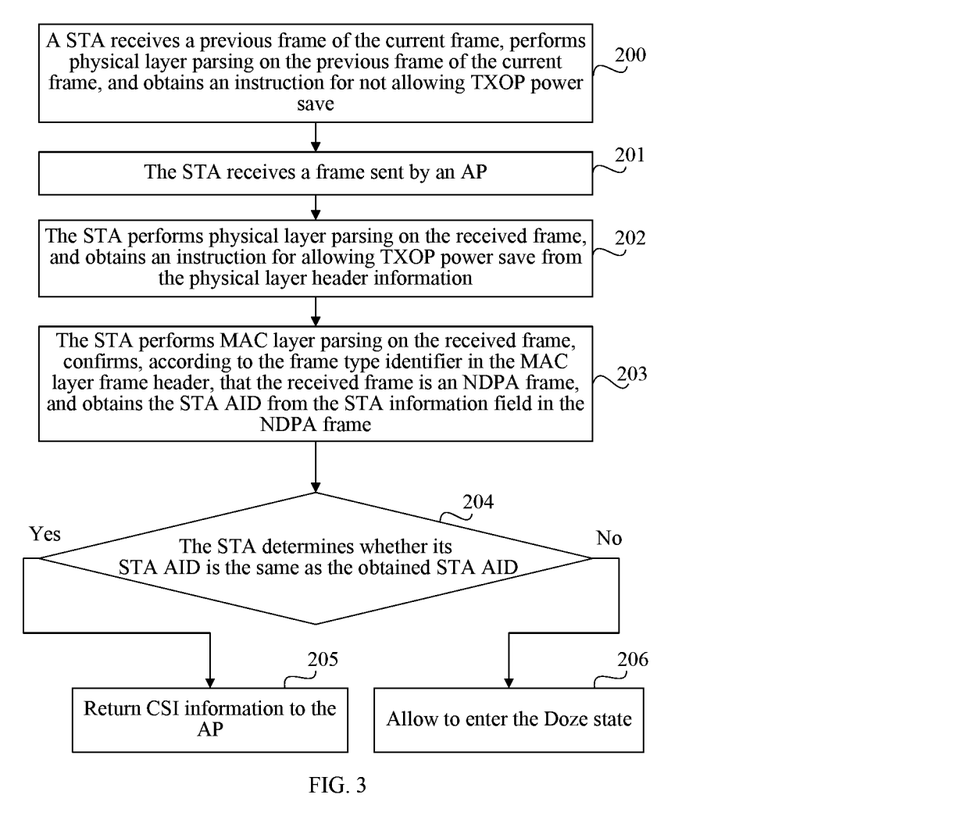
FIG. 3 is a flow chart of a power save method according to still another embodiment of the present invention.

FIG. 3 is a flow chart of a power save method according to still another embodiment of the present invention. The embodiment is implemented based on the embodiment shown in FIG. 2; as shown in FIG. 3, the method in this embodiment includes the following step before step 201:

Step 200: The STA receives a previous frame of the current frame, performs physical layer parsing on the previous frame of the current frame, and obtains an instruction for not allowing TXOP power save.

Specifically, if the current frame is not the first frame of the VHT format during the current TXOP, before receiving the current frame (namely, an NDPA frame), the STA receives other frames of the VHT format sent by the AP, where the other frames of the VHT format also carry the instruction for whether to allow the STA to perform TXOP power save (namely, an instruction for whether to allow the STA to enter the Doze state). During one TXOP, once the AP sends to the STA an instruction for allowing the STA to perform TXOP power save, the instruction must last until the TXOP ends. Therefore, in this embodiment, the STA needs to confirm, according to the physical layer header information in the previous frame of the current frame, that the AP does not allow the STA to enter the Doze state, but confirms, according to the physical layer header information of the current frame, that the AP allows the STA to enter the Doze state.

Specifically, when receiving each frame sent by the AP, the STA needs to perform physical layer parsing on the received frame, and determines, according to the TXOP_PS_NOT_ALLOWED parameter in the physical layer header, whether the AP allows the STA to perform TXOP power save.

In this embodiment, the NDPA frame or other frames during the TXOP may be frames of the VHT format. In addition, in other embodiments of the present invention, the frame during the TXOP or the NDPA frame may be a frame of the VHT format.

With the power save method in this embodiment, the STA confirms, according to the previous frame of the current frame (namely, the NDPA frame), that the AP does not allow the STA to perform TXOP power save before the current time, that is, the AP does not allow the STA to enter the Doze state, but confirms, according to the current frame, that the AP allows the STA to perform TXOP power save at the current time, and executes the subsequent operation of determining whether to allow the STA to enter the Doze state under the condition, which provides a basis for entering the Doze state to save power.

For example, during one TXOP, after sending data frames to some STAs, the AP also requires some STAs to feed back CSI information; because some STAs need to receive data frames, the VHT TXOP power save mode cannot be applied to the entire TXOP period. It is assumed that a BSS includes at least four STAs and one AP, and at the beginning of the TXOP, the AP sends data frames to the first STA and the second STA, so that within the period, the AP sets the TXOP_PS_NOT_ALLOWED parameter in the sent data frames to 1, indicating that the STA is not allowed to enter the Doze state and that all STAs are in the Awake state. Subsequently, the AP also requires the third STA and the fourth STA to feed back CSI information. When the AP sends the NDPA frame, the AP sets the TXOP_PS_NOT_ALLOWED parameter in the NDPA frame to 0, indicating that the STA is allowed to enter the Doze state. Because the NDPA frame is sent by broadcast, all STAs can receive the NDPA frame. The STA learns, according to the TXOP_PS_NOT_ALLOWED parameter in the previous data frame of the NDPA frame, that the AP does not allow the STA to enter the Doze state at that time, and learns, according to the TXOP_PS_NOT_ALLOWED parameter in the NDPA frame, that the AP allows the STA to enter the Doze state at this time. Under the condition, the STAs that the AP does not require to feed back CSI information may confirm, according to the method shown in FIG. 1A, FIG. 2 or FIG. 3, that the STAs can enter the Doze state, and enter the Doze state when the entry condition is satisfied, so as to reduce power consumption and save resources.

Based on the above embodiments, the STA also periodically receives a beacon frame sent by the AP, where the beacon frame includes an instruction for allowing the BSS where the STA is located to perform TXOP power save; the STA obtains the instruction for allowing the BSS where the STA is located to perform TXOP power save included in the beacon frame. Specifically, the AP uses the bit carrying the very high throughput transmission opportunity power save (Very High Throughput Transmission Opportunity Power Save, VHT TXOP PS) parameter to indicate the instruction for whether to allow the basic service set to perform TXOP power save. When VHT TXOP PS is set to 1, it indicates an instruction for allowing the basic service set where the STA is located to perform TXOP power save; when VHT TXOP PS is set to 0, it indicates an instruction for not allowing the basic service set where the STA is located to perform TXOP power save. The AP notifies whether the BSS has the capability of TXOP power save by broadcasting the beacon frame; the AP can send to the STA the instruction for whether to allow the STA to perform TXOP power save and perform subsequent operations only when the BSS has the capability of TXOP power save. Therefore, the AP sends to the STA through a beacon frame the instruction for allowing the BSS where the STA is located to perform TXOP power save, which provides a basis for the above embodiments.

The purposes of the above embodiments of the present invention are further described herein. The above embodiments of the present invention provide the STA with a new method for determining whether to allow the STA to enter the Doze state, which provides a basis for the STA to enter the Doze state, and provides a basis for the STA to enter the Doze state to save power.

The specific implementation processes of the above embodiments are further described below with reference to the existing condition for the STA to determine whether to allow the STA to enter the Doze state.

When the AP contends for the TXOP successfully, the AP sends various types of frames to the STA, for example, a control frame, a data frame, and a broadcast frame (NDPA frame). However, during the TXOP, not all STAs have data frames to receive, and a STA that has no data frame to receive can enter the Doze state to save power. If the STA wants to enter the Doze state, the following prerequisites need to be satisfied: First, the AP allows the BSS to perform TXOP power save; secondly, the AP allows the STA to enter the Doze state; and thirdly, the STA itself supports the TXOP power save mode. When the above prerequisites are satisfied, the STA can further determine whether to allow the STA to enter the Doze state. Therefore, in this embodiment, it is first assumed that the above prerequisites are satisfied, so the STA determining whether to allow the STA to enter the Doze state includes the following:

The STA receives the frame sent by the AP, performs physical layer parsing on the received frame, obtains the physical layer header information, further performs MAC layer parsing on the received frame, and obtains the MAC layer header information. Next, the STA determines, according to the following conditions, whether to allow the STA to enter the Doze state. The main conditions are as follows: (1) The STA confirms, according to the GROUP_ID in the receive vector parameter (RXVECTOR), that the local STA is not a member of the group corresponding to the data frame. (2) The STA confirms, according to a partial association identifier of the STA in the receive vector parameter (RXVECTOR) in the data frame, or according to a partial association identifier (PARTIAL_AID) of the STA in the receive vector parameter (RXVECTOR) in the data frame and the STA AID of the MAC layer, that the data frame is not sent to the local STA. (3) The STA confirms, according to the GROUP_ID in the receive vector parameter (RXVECTOR) in the data frame, that the local STA is a member of the group corresponding to the data frame, but confirms, according to the NUM_SYS in the receive vector parameter (RXVECTOR), that the data frame is not sent to the local STA. (4) The STA sends a confirmation signal to respond to the received frame whose More Data field is set to 0. (5) The STA finds that the STA AID in the STA information field in the NDPA frame is different from its STA AID.

Specifically, for the first condition, the operation procedure of the STA may be: The STA first obtains the physical layer header information, which mainly refers to the GROUP_ID in the receive vector parameter (RXVECTOR); then the STA compares the GROUP_ID in the receive vector parameter (RXVECTOR) with the GROUP_ID locally stored by the STA; if the comparison result is that the two are the same, the STA confirms that the STA belongs to the group corresponding to the data frame; if the comparison result is that the two are different, the STA confirms that the STA does not belong to the group corresponding to the data frame. The group corresponding to the data frame is a group identified by the GROUP_ID in the data frame. When the STA confirms that the STA belongs to the group corresponding to the data frame, it indicates that the AP is sending the data frame to the group and therefore the STA, as a member of the group, cannot enter the Doze state; when the STA confirms that the STA does not belong to the group corresponding to the data frame, it indicates that the current AP does not send the data frame to the group the STA belongs to, and therefore the STA enters the Doze state to save power.

For the second condition, the operation procedure of the STA may be: The STA first obtains the physical layer header information carried in the data frame, which mainly refers to the partial association identifier (PARTIAL_AID) of the STA in the receive vector parameter (RXVECTOR); then the STA compares the partial association identifier (PARTIAL_AID) of the STA in the receive vector parameter (RXVECTOR) with the partial association identifier (PARTIAL_AID) of the local STA. If the comparison result is that the two partial association identifiers of the STAs are the same, it indicates that the data frame might be sent to the STA, and therefore, the STA further performs determination, and obtains the MAC layer information in the data frame, which refers to the MAC address; then, the STA compares the obtained MAC address with its MAC address; if the comparison result is that the two MAC address are the same, the STA confirms that the data frame is sent to the STA itself, and that the current STA has data frames to receive and thus cannot enter the Doze state. If the comparison result is that the two partial association identifiers (PARTIAL_AID) of the STAs are different, the STA can directly confirm that the data frame is not sent to the STA itself, and therefore the STA can enter the Doze state to save power.

For the third condition, the operation procedure of the STA may be: The STA first obtains the physical layer header information carried in the data frame, which mainly refers to the GROUP_ID in the receive vector parameter (RXVECTOR); then the STA compares the GROUP_ID in the receive vector parameter (RXVECTOR) with the locally stored GROUP_ID; if the comparison result is that the two are the same, the STA confirms that the STA belongs to the group corresponding to the data frame; if the comparison result is that the two are different, the STA confirms that the STA does not belong to the group corresponding to the data frame. The group corresponding to the data frame is a group identified by the GROUP_ID in the data frame. When the STA confirms that the STA belongs to the group corresponding to the data frame, it indicates that the AP is sending the data frame to the group the STA belongs to; further, the STA obtains the NUM_STS in the receive vector parameter (RXVECTOR), where the NUM_STS indicates the number of space-time streams sent by the AP to the STA; when the NUM_STS is not 0, it indicates that the AP is sending a data packet to the STA and therefore the STA cannot enter the Doze state; when the NUM_STS is 0, it indicates that the AP does not send a data frame to the STA and therefore, the STA enters the Doze state to save power. When the STA confirms that the STA does not belong to the group corresponding to the data frame, it indicates that the current AP does not send the data frame to the group that the STA belongs to, and therefore the STA may enter the Doze state to save power. The scenario is the first condition.

For the fourth condition, the operation procedure of the STA may be: The STA first obtains the More Data field in the data frame, and determines whether the More Data field is 0, where the More Data field indicates whether the data frame is the last data frame sent by the AP during the TXOP. After the STA sends an acknowledgment frame to respond to the received data frame whose More Data field is 0, the STA can enter the Doze state to save power.

For the fifth condition, the operation procedure of the STA may be: The STA obtains MAC layer frame header information, first, the frame type identifier, confirms that the frame is an NDPA frame, then obtains the STA AID in the NDPA frame, and confirms that the STA AID in the NDPA frame is different from its STA AID, indicating that the AP does not require the STA to return CSI information, and thus the STA can enter the Doze state to save power.

Through the above operations, when the STA determines that the STA can enter the Doze state and other entry conditions are satisfied, the STA can enter the Doze state and does not wake until the TXOP ends. Further, in actual applications, the STA determines, only based on the above five conditions, whether to enter the Doze state, but the sequence of the five conditions is not limited. The STA can enter the Doze state as long as one of the five conditions is satisfied.

With the power save method in each embodiment of the present invention, in the scenario where the AP requires multiple STAs to return CSI information, the STA determines whether the STA itself needs to return CSI information by identifying the NDPA frame and comparing the STA AID carried in the NDPA frame with its STA AID, and enters the Doze state when confirming that it is unnecessary to return CSI information, thus saving power.

Figure 4:
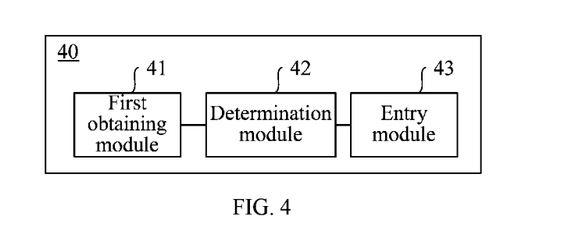
FIG. 4 is a schematic structural diagram of a station device according to an embodiment of the present invention.

FIG. 4 is a schematic structural diagram of a station device according to an embodiment of the present invention. The station device in this embodiment of the present invention may be a station STA or an access point AP in a wireless local area network. Particularly, the station device may be a STA or an AP that can perform multiple-user transmission, and can enter the power save mode. As shown in FIG. 4, the station device 40 in this embodiment includes: a first obtaining module 41, a determination module 42, and an entry module 43.

The first obtaining module 41 is configured to confirm, according to a frame type identifier in a received frame, that the received frame is an NDPA frame, and obtain a STA AID in a STA information field in the NDPA frame. The determination module 42 is connected to the first obtaining module 41 and is configured to compare the STA AID of the station device with the obtained STA AID, and determine whether the STA AID of the station device is the same as the obtained STA AID. The entry module 43 is connected to the determination module 42 and is configured to allow the STA to enter the doze state when the determination result of the determination module 42 is no.

The station device in this embodiment may be a STA, and the above functional modules may be configured to execute the procedures of the power save method shown in FIG. 1. The specific operating principles are described in the method embodiment and not repeated herein.

With the station device in this embodiment, in the scenario where the AP requires multiple STAs to return CSI information, the STA determines whether the STA itself needs to return CSI information by identifying the NDPA frame and comparing the STA AID carried in the NDPA frame with its STA AID, and allows the STA to enter the Doze state when confirming that it is unnecessary to return CSI information, and enters the Doze state when other entry conditions are satisfied, thus saving power.

Figure 5:
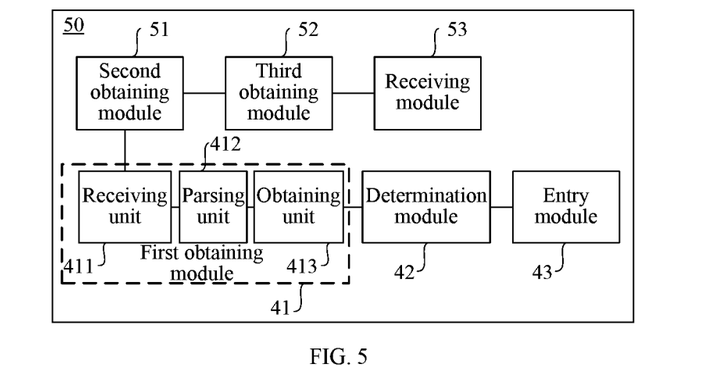
FIG. 5 is a schematic structural diagram of a station device according to another embodiment of the present invention.

FIG. 5 is a schematic structural diagram of a station device according to another embodiment of the present invention. This embodiment is implemented based on the embodiment shown in FIG. 4. As shown in FIG. 5, the first obtaining module 41 of the station device 50 in this embodiment includes: a receiving unit 411, a parsing unit 412, and an obtaining unit 413.

Specifically, the receiving unit 411 is configured to receive the frame sent by the AP. The parsing unit 412 is connected to the receiving unit 411 and is configured to perform MAC layer parsing on the frame received by the receiving unit 411. The obtaining unit 413 is connected to the parsing unit 412 and is configured to confirm, according to the value of the frame type identifier in the MAC layer frame header, that the received frame is an NDPA frame, and obtains the STA AID from the STA information in the NDPA frame.

The functional units of the first obtaining module 41 may be configured to execute the procedure shown in step 101 in the embodiment shown in FIG. 1. The specific operating principles are described in the method embodiment and not repeated herein.

Further, the station device in this embodiment further includes a second obtaining module 51. The second obtaining module 51 is configured to perform, before the first obtaining module 41 confirms, according to the frame type identifier in the received frame, that the received frame is an NDPA frame and obtains the STA AID in the NDPA frame, physical layer parsing on the frame received by the receiving unit 411, and obtain an instruction for allowing TXOP power save, thus providing a basis for the first obtaining module 41. The second obtaining module 51 is specifically configured to obtain the value of a bit identifying TXOP power save not allowed (TXOP_PS_NOT_ALLOWED) in the VHT-SIG-AI, where the value of the bit is 0.

The second obtaining module 51 may be specifically configured to execute the procedures of the power save method shown in FIG. 2. The specific operating principles are described in the method embodiment and not repeated herein.

Furthermore, the station device in this embodiment includes a third obtaining module 52. The third obtaining module 52 is configured to perform physical layer parsing on a previous frame of the current frame when the current frame is not the first frame of the current TXOP, and obtain an instruction for not allowing TXOP power save, thus providing a basis for subsequent functional modules or units to execute the corresponding operations. The third obtaining module 52 is specifically configured to obtain the value of a bit identifying TXOP power save not allowed (TXOP_PS_NOT_ALLOWED) in the VHT-SIG-A1, where the value of the bit is 1.

The third obtaining module 52 may be specifically configured to execute the procedure of the power save method shown in FIG. 3. The specific operating principles are described in the method embodiment and not repeated herein.

Furthermore, the station device in this embodiment includes a receiving module 53. The receiving module 53 is configured to receive a beacon frame periodically sent by the AP, and obtain an instruction for allowing the BSS where the station device is located to perform TXOP power save included in the beacon frame, thus providing a basis for the above functional modules or units of the station device to execute the corresponding operations. The receiving module 53 is specifically configured to obtain the value of a bit identifying very high throughput transmission opportunity power save (VHT TXOP PS), where the value of the bit is 1.

With the station device in this embodiment, the above functional modules, namely, the second obtaining module, the third obtaining module, and the receiving module respectively confirm that various prerequisites required for the station device to enter the Doze state. This provides a basis for the first obtaining module, determination module, and entry module to execute the operation of determining whether the station device can enter the Doze state under the condition that the AP requires multiple station devices to return CSI information, and guarantees that the station device enters the Doze state when the condition is satisfied to reduce power consumption.

Persons of ordinary skill in the art should understand that all or a part of the steps of the method according to the embodiments may be implemented by a program instructing relevant hardware. The program may be stored in a computer readable storage medium. When the program is run, the steps of the method according to the embodiments are performed. The storage medium may be any medium that is capable of storing program codes, such as a ROM, a RAM, a magnetic disk or an optical disk.

What is claimed is:

1. A power save method comprising:
   receiving, by a station (STA), a null data packet announcement (NDPA) frame in a current transmission opportunity (TXOP) from an access point (AP), wherein the NDPA frame carries a PARTIAL_AID and a transmission opportunity_power save_not_allowed (TXOP_PS_NOT_ALLOWED), the PARTIAL_AID is zero, the TXOP_PS NOT_ALLOWED is zero;
   obtaining an STA association identifier (AID) from an STA information field of the NDPA frame;
   comparing, by the STA, an STA AID corresponding to the STA with the obtained STA AID from the STA information field of the NDPA frame;
   determining whether the STA AID corresponding to the STA is the same as the obtained STA AID;
   when the STA AID corresponding to the STA is determined to be different from the obtained STA AID, allowing the STA to enter a doze state until an end of the current TXOP; and
   when the STA AID corresponding to the STA is determined to be the same as the obtained STA AID, returning, by the STA, channel state information (CSI) to the AP.

2. The power save method according to claim 1, wherein before the obtaining, the method comprises:
   performing, by the STA, physical layer parsing on the NDPA frame, and obtaining an instruction for allowing TXOP power save.

3. The power save method according to claim 2, wherein the NDPA frame is not a first frame of a very high throughput (VHT) format of the current TXOP, and wherein, before the obtaining, the method comprises:
   performing, by the STA, physical layer parsing on a previous frame, and obtaining an instruction for not allowing TXOP power save.

4. The power save method according to claim 1, further comprising:
   receiving, by the STA, a beacon frame sent by the AP, and obtaining an instruction from the beacon frame for allowing a basic service set where the STA is located to perform TXOP power save.

5. The power save method according to claim 4, wherein obtaining the instruction from the beacon frame for allowing a basic service set where the STA is located to perform TXOP power save comprises:
   obtaining, by the STA, a value of a bit for identifying very high throughput transmission opportunity power save (VHT TXOP PS) in the beacon frame, wherein the value of the bit is 1.

6. A station device, comprising:
   a receiver, configured to (a) receive a null data packet announcement (NDPA) frame in a current transmission opportunity (TXOP) from an access point (AP), wherein the NDPA frame carries a PARTIAL_AID and a transmission opportunity_power save_not_allowed (TXOP_PS_NOT_ALLOWED) and the PARTIAL_AID and the TXOP_PS_NOT_ALLOWED are zero and (b) obtain a station (STA) association identifier (AID) from an STA information field of the NDPA frame;
   a processor, configured to compare an STA AID of the station device with the obtained STA AID from the STA information field of the NDPA frame, and determine whether the STA AID of the station device is the same as the obtained STA AID; and
   a transmitter, configured to (a) allow the station device to enter a doze state until an end of the current TXOP when the processor determines that the STA AID of the station device is not the same as the obtained STA AID and (b) return channel state information (CSI) to the AP when the STA AID of the station device is the same as the obtained STA AID.

7. The station device according to claim 6, further comprising:
   the receiver is further configured to perform physical layer parsing on the NDPA frame, and obtain an instruction for allowing TXOP power save.

8. The station device according to claim 7, further comprising:
   the receiver is further configured to perform, when the NDPA frame is not a first frame of a very high throughput (VHT) format of the current TXOP, physical layer parsing on a previous frame of the VHT format of the NDPA frame, and obtain an instruction for not allowing TXOP power save.

9. The station device according to claim 6, further comprising:

the receiver is further configured to receive a beacon frame sent by the AP, and obtain an instruction from the beacon frame for allowing a basic service set where the station device is located to perform TXOP power save.

10. The station device according to claim 9, wherein the receiver is further configured to obtain a value of a bit for identifying very high throughput transmission opportunity power save (VHT TXOP PS) in the beacon frame, wherein the value of the bit is 1.

11. A non-transitory computer-readable medium having processor-executable instructions stored thereon for saving power for a station (STA), the processor-executable instructions comprising instructions for:

receiving a null data packet announcement (NDPA) frame in a current transmission opportunity (TXOP) from an access point (AP), wherein the NDPA frame carries a PARTIAL_AID and a transmission opportunity_power save_not_allowed (TXOP_PS_NOT_ALLOWED), the PARTIAL_AID is zero, the TXOP_PS_NOT_ALLOWED is zero;

obtaining an STA association identifier (AID) from an STA information field of the NDPA frame;

comparing an STA AID corresponding to the STA with the obtained STA AID from the STA information field of the NDPA frame;

determining whether the STA AID corresponding to the STA is the same as the obtained STA AID; and when the STA AID corresponding to the STA is different from the obtained STA AID, allowing the STA to enter a doze state until an end of the current TXOP and when the STA AID corresponding to the STA is the same as the obtained STA AID, returning channel state information (CSI) to the AP.

12. The non-transitory computer-readable medium of claim 11, having processor-executable instructions stored thereon for saving power for a station (STA) further comprising:

performing physical layer parsing on the NDPA frame, and obtaining an instruction for allowing TXOP power save.

13. The non-transitory computer-readable medium of claim 11, having processor-executable instructions stored thereon for saving power for a station (STA) further comprising:

receiving a beacon frame sent by the AP, and obtaining an instruction from the beacon frame for allowing a basic service set where the STA is located to perform TXOP power save.

* * * * *